Aug. 28, 1934.  J. B. BACON  1,971,845

SURGICAL INSTRUMENT

Filed Oct. 5, 1933  4 Sheets-Sheet 1

Inventor:
Joseph B. Bacon,
By Byron Smith, Lee, Clinton & Wiles,
Attys.

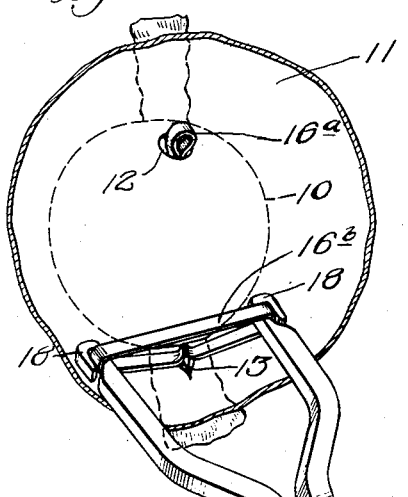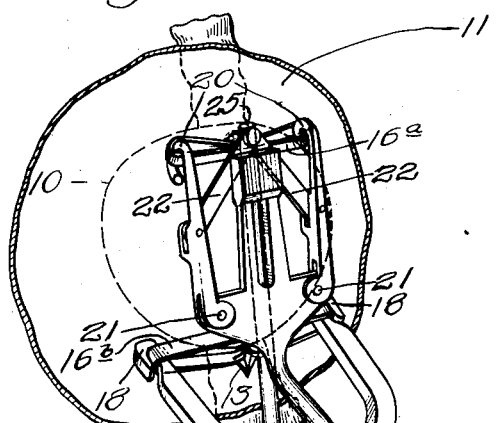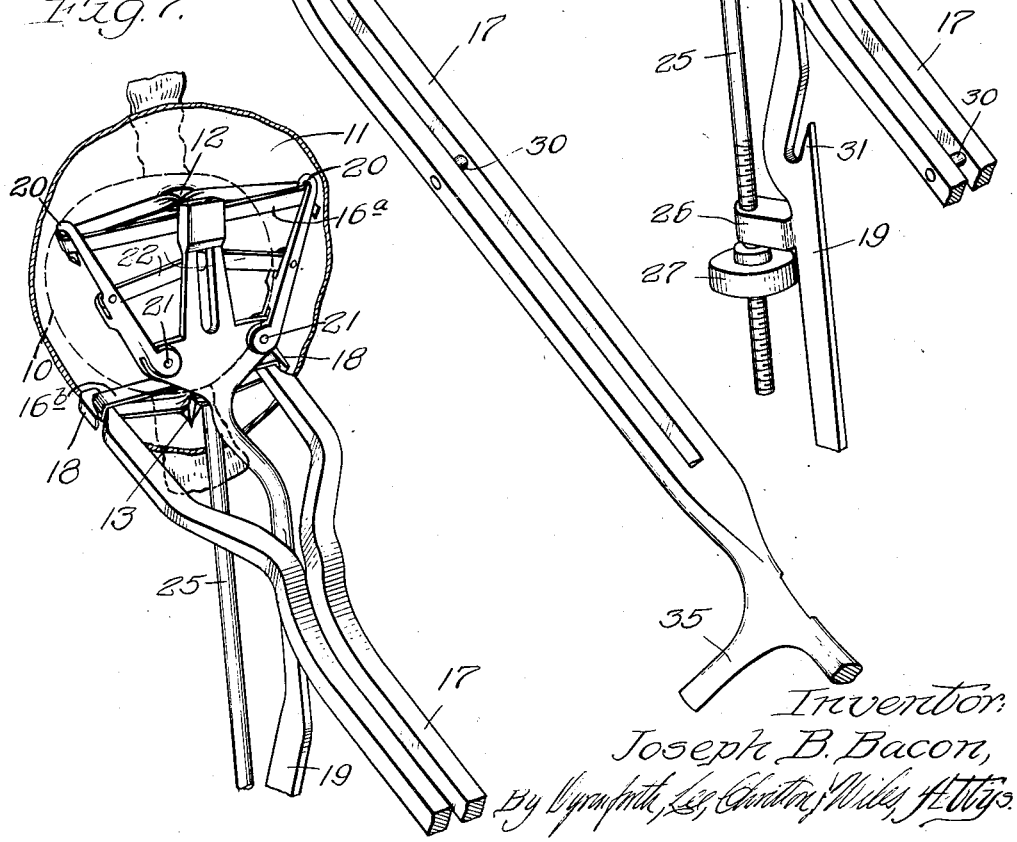

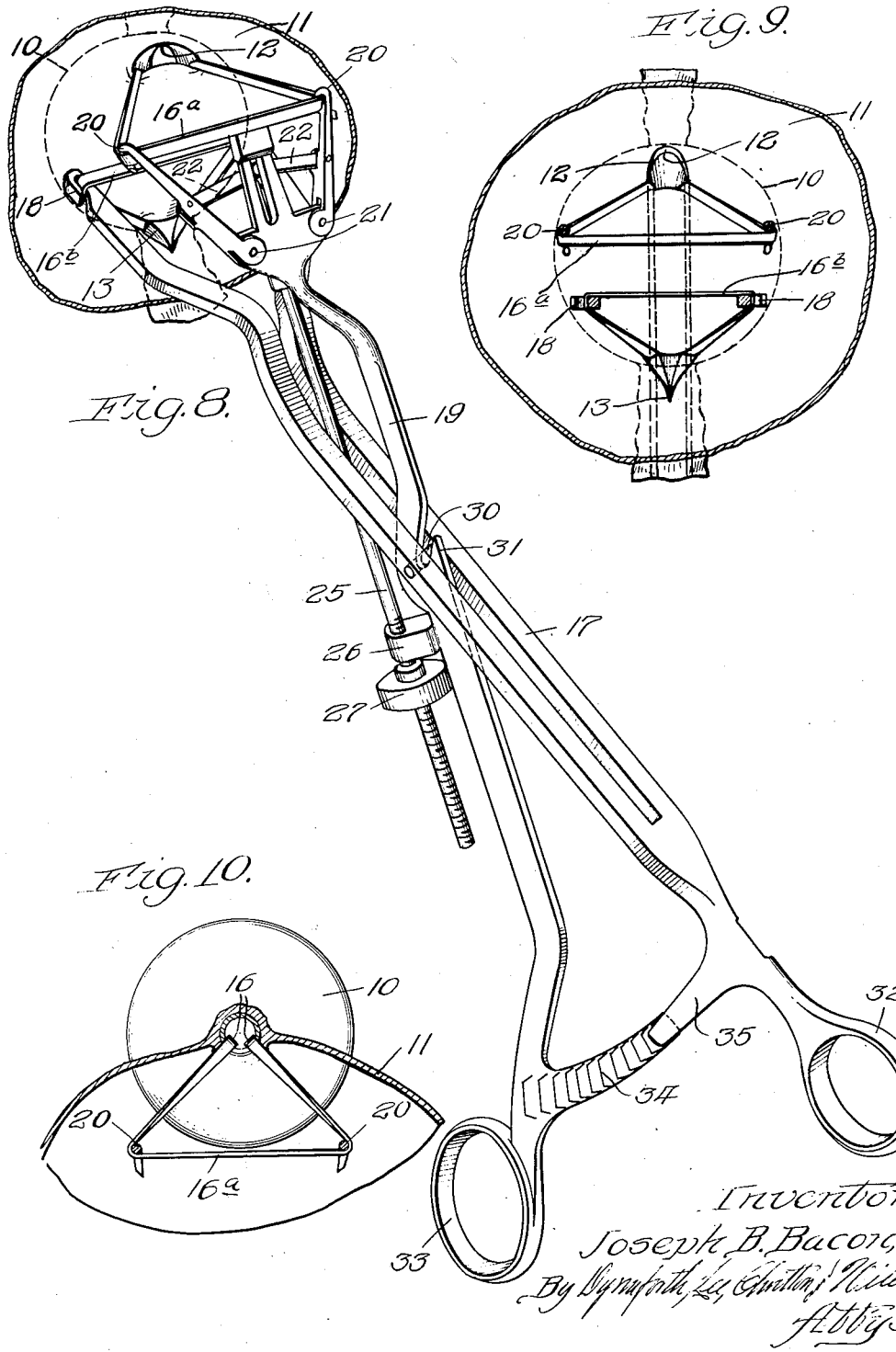

Aug. 28, 1934.  J. B. BACON  1,971,845
SURGICAL INSTRUMENT
Filed Oct. 5, 1933  4 Sheets-Sheet 4

Inventor:
Joseph B. Bacon,
By [signature]
Attys.

Patented Aug. 28, 1934

1,971,845

UNITED STATES PATENT OFFICE 1,971,845

SURGICAL INSTRUMENT

Joseph B. Bacon, Macomb, Ill., assignor of one-half to George L. Athey, Beardstown, Ill.

Application October 5, 1933, Serial No. 692,337

9 Claims. (Cl. 128—305)

This invention relates to improvements in surgical instrument and, more especially, such an instrument adapted for performing the operation of transurethral prostatectomy.

Among the features of my invention is the making of an instrument adapted to hold a double elastic ligature (previously inserted in the prostate gland) in stretched condition to cause the same to make two radial cuts through the gland, thereby removing the top thereof. By the use of my improved instrument, the operation is performed relatively quickly in a simple manner and the danger and ill-effects greatly reduced. By using a double ligature to make two cuts at once, the entire operation is performed at one time; and making the cuts with elastic ligatures greatly reduces the danger of hemorrhage.

Other features and advantages of my invention will appear more fully as I proceed with my specification.

In the accompanying drawings, I have shown my improved instrument and the method of using the same. In these drawings—

Figure 1:
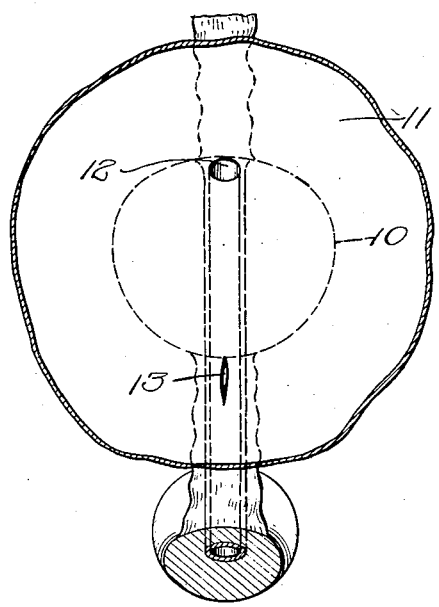
Figure 2:
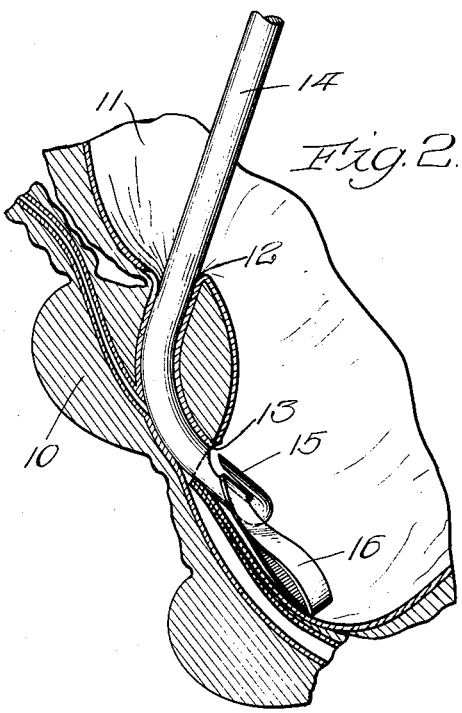
Figure 3:
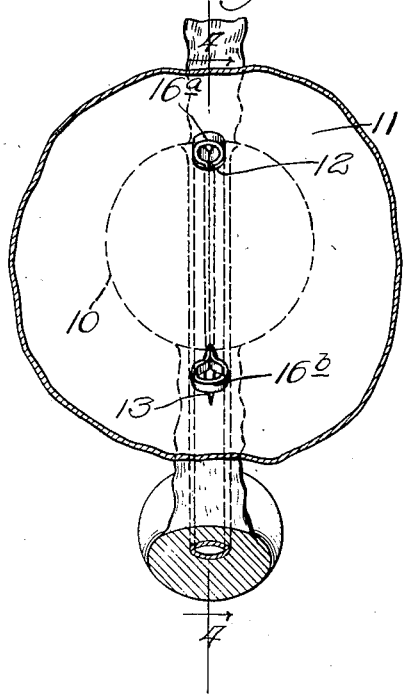
Figure 4:
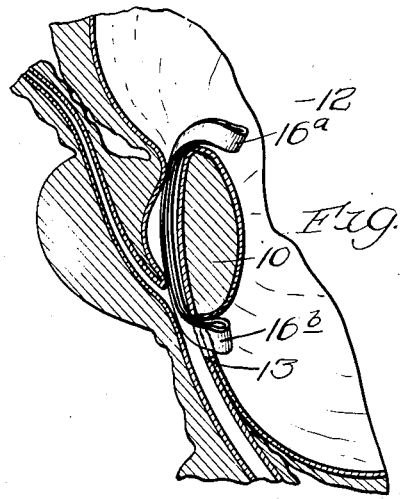
Figure 11:
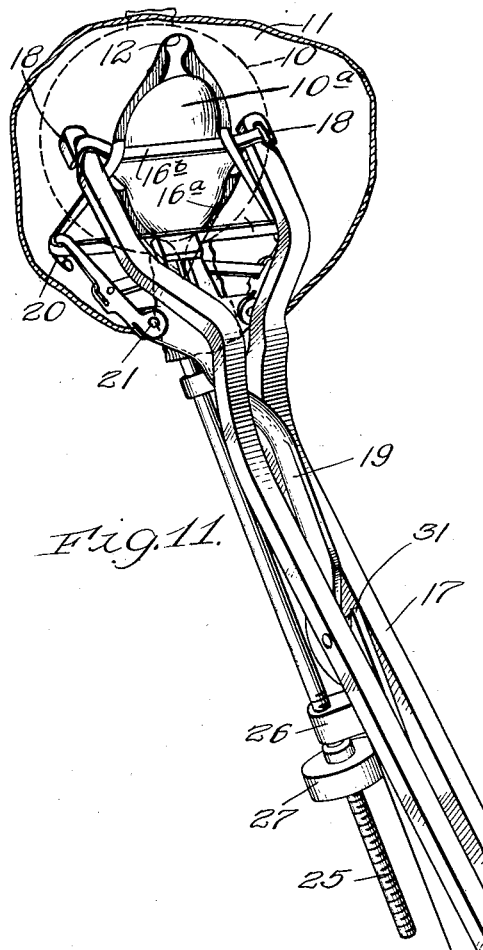
Figure 12:
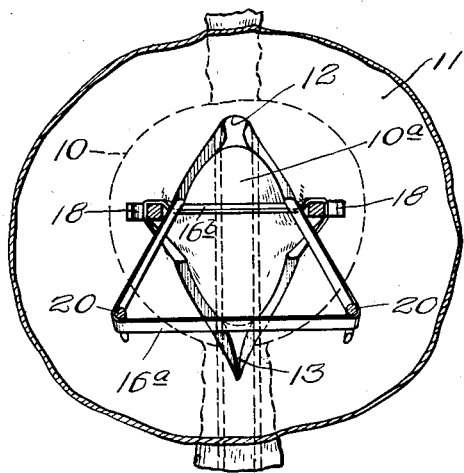
Figure 13:
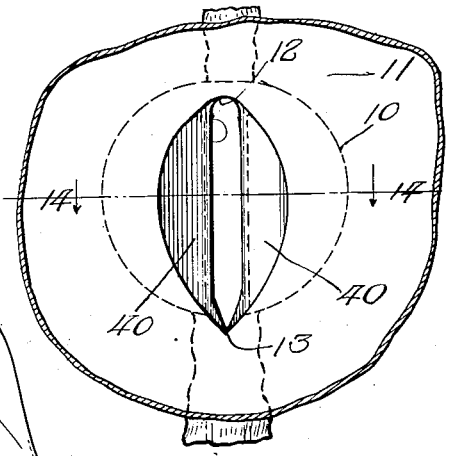
Figure 14:
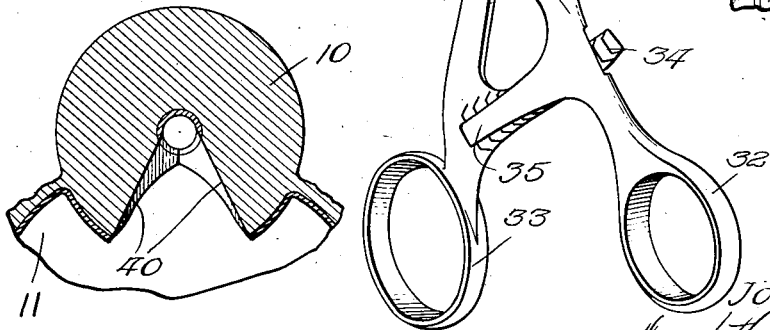

Figure 1 is a view of the prostate gland and adjoining parts showing the incision made prior to the insertion of the double ligature; Fig. 2 is a similar view in vertical section showing the sound or needle inserted prior to drawing the double ligature into place; Fig. 3 is a view similar to Fig. 1, showing the ligature in place; Fig. 4 is a view taken as indicated by the line 4 of Fig. 3; Fig. 5 is a view in perspective showing one jaw of the instrument attached to the lower end of the double ligature; Fig. 6 is a similar view showing the other jaw attached to the other end of the ligature; Fig. 7 shows the upper jaw spread; Fig. 8 shows the jaws pivotally connected at the commencement of the operation; Fig. 9 is a sectional view through the ends of the jaws with the same in the position shown in Fig. 8; Fig. 10 is a view in end elevation of the prostate gland showing the double ligature as the same is held by the instrument when in the position shown in Figs. 8 and 9; Fig. 11 shows the instrument after the jaws have been adjusted to complete the operation; Fig. 12 is a sectional view showing the jaws in the same position; Fig. 13 is a view of the prostate gland after the operation is completed; and Fig. 14 is a view taken as indicated by the line 14 of Fig. 13.

Before describing in detail the operation and the use of the instrument, it will be helpful to give a brief description of the construction of the instrument itself. This instrument is in the nature of a forceps, including two pivoted jaws, each having a pair of hooked fingers on the end. The fingers of one jaw can be spread or contracted by operation of a milled nut. At the commencement of the operation, the hooked fingers of each jaw are engaged in the looped ends of the elastic ligature, the movable fingers being spread. This causes the two strands of the ligature in the gland to start separate radial cuts. After the cutting has progressed a certain amount, the movable fingers are adjusted closer together to permit the end of this jaw to be moved between the fingers of the other jaw; and the jaws are again separated (and the fingers again spread) to cause the ligatures to finish the cuts.

As shown in the drawings, the instrument includes the bifurcated jaw 17, the furcations or tines of which terminate in the separated hooked fingers 18, 18. The other jaw of the instrument is indicated by 19 and the same terminates in the movable hooked fingers 20, 20. These fingers are pivoted to the jaw at 21, 21 and are connected by the toggle levers 22, 22 which, in turn, are pivotally connected to the end of the adjusting rod 25 passing through a lug 26 on the jaw 19 and controlled by the milled nut 27. Rotation of the nut 27 to pull the rod 25 outwardly serves to spread the fingers 20, 20. Between the furcations of the jaw 17 is a pivot pin 30 adapted to be engaged by the hook 31 on the jaw 19 to permit pivotal attachment between the jaws.

The jaws 17 and 19 are provided with the handles 32 and 33, respectively. The jaw 19 is provided with a curved toothed bar 34 and the jaw 17 is provided with a hook member 35 adapted to engage the tooth in the bar 34 to hold the two jaws from separating, as hereinafter described.

Preceding the prostate operation itself, the first step is to open the abdomen above the pubis in the mid-line, exposing the bladder 11 and surrounding fat extra-peritoneal. The bladder is then opened sufficiently to facilitate the introduction of the instruments into the same. In the drawings I have shown only a portion of the bladder, as indicated by 11, it being understood that the same has been previously opened as mentioned. The prostate gland is indicated by 10. A curved sound or needle 14 with a hook 15 on the end is then inserted in the urethral opening 12 (which opens into the bladder) and through the prostatic-urethra to its junction with the membranous urethra, at which place a small incision 13 is made over the point of the sound and the instrument then is pushed on through this opening, again entering the bladder. The jaw 17 of the forceps carrying a pure gum rubber ring 16 is then introduced and said ring hooked on one side over the hook 15 on the sound. The sound is then drawn back into the bladder through the urethra carrying with it one side of the rubber ring which was attached thereto. The other jaw 19 of the forceps containing the spreader which comprises the movable hooked fingers 20, 20 is then hooked into the upper loop 16ª of the rubber ring as the hook 15 of the sound is disengaged therefrom. The two jaws of the forceps are then pivotally engaged by hooking the hook 31 over the pin 30 as shown in Fig. 8; and the fingers 20, 20 are spread. This marks the commencement of the operation and it will be seen that both ends of the looped ligature are spread and the entire ligature is put under tension. This spreading of both ends of the ligature forms virtually a double ligature and causes the two strands in the gland to start separate and distinct cuts by pressure atrophy radially outwardly and away from each other. It is important that both ends of the ligature be widely separated so that the two strands will thus make independent cuts and will not start cutting in the same place. Fig. 10 especially shows how the two strands of the ligature inside of the gland are pulled outwardly and away from each other so that two separate cuts will be started.

After the cutting has proceeded a certain distance, for example, after about twenty or twenty-four hours, the fingers engaging the upper loop and the fingers engaging the lower loop are reversed to cause the two strands of the ligature passing through the gland to be crossed to complete the cutting of the pedicules. This is accomplished by closing the fingers 20, 20 by releasing the nut 27. When this nut is released, the tension of the ligature pulls these fingers together. When these fingers are thus brought together, the handles 32 and 33 are also brought together to cause the fingers 20, 20 on the end of the jaw 19 to pass between the fingers on the other jaw. The nut 27 is then again tightened to again spread the fingers 20, 20. This brings the fingers 20, 20 below the fingers 18, 18, as shown in Fig. 11. When in this position, the two strands of the ligature in the gland will be crossed to complete the cut and cause complete severance of the two pedicules. This serves to completely remove the top portion 10ª from the prostate gland to complete the operation. The prostate with this portion removed is shown in Figs. 13 and 14, in which the cuts made by the two strands of the double ligature are indicated by 40, 40.

The hook 35 may be engaged on the end tooth of the bar 34 to hold the instrument in position for the first part of the operation and may then be moved up, as shown in Fig. 11, to complete the operation.

In Fig. 2 I have shown the double elastic ligature 16 hooked over the hook 15 of the sound, but for clarity this figure does not show the jaw 17 in place. Likewise, in Figs. 3 and 4, the position of the ligature only is illustrated and the jaws of the instrument and the sound are shown as removed. Fig. 5 shows the upper end 16ª of the ligature with the sound removed and the hooks 20 not yet engaged. Fig. 6 shows the hooks engaged but not yet spread. Fig. 7 shows the hooks engaged and spread but the jaws of the forceps not yet pivotally engaged.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A surgical instrument of the character described, including; a pair of jaws; means for pivotally connecting said jaws; means for spreading the jaws; a pair of fingers on the end of each jaw; and means on the ends of said fingers, each for engaging a strand of a double ligature.

2. A surgical instrument of the character described, including; a pair of jaws; means for pivotally connecting said jaws; means for spreading the jaws; a pair of hooked fingers on the end of each jaw; and means on the ends of said fingers, each for engaging a strand of a double ligature.

3. A surgical instrument of the character described, including; a pair of jaws; means for pivotally connecting said jaws; means for spreading the jaws; a pair of fingers on the end of each jaw; and means on the ends of said fingers, each for engaging the ends of a looped ligature.

4. An instrument as claimed in claim 1, in which the fingers on one of the jaws are adjustable toward and away from each other.

5. An instrument as claimed in claim 2, in which the fingers on one of the jaws are adjustable toward and away from each other.

6. An instrument as claimed in claim 3, in which the fingers on one of the jaws are adjustable toward and away from each other.

7. An instrument of the character described, including; a bifurcated jaw having separated fingers on the ends of the furcations; means on said fingers for engaging a ligature; a second jaw adapted to operate between the furcations of the first jaw; a pair of separated fingers on said second jaw; means for attaching said fingers to a ligature; and means for pivotally connecting said jaws.

8. An instrument as claimed in claim 7, in which the fingers on the second jaw are adjustable toward and away from each other.

9. An instrument of the character described, including; means for engaging the looped ends of a double ligature extending through the prostate gland; means for spreading said engaging means to spread said looped ends to cause said ligature to make two independent radial cuts; and means for reversing the positions of said engaging means to cause the looped ends of the ligature to cross each other to complete the cutting of the pedicules.

JOSEPH B. BACON.